United States Patent

Crane et al.

[15] 3,699,249

[45] Oct. 17, 1972

[54] FACSIMILE SYSTEMS, TRANSCEIVERS, AND MARKING TRANSDUCERS THEREFOR

[72] Inventors: Paul J. Crane, Torrance; Glenn A. Reese, San Pedro, both of Calif.

[73] Assignee: The Magnovox Company, Torrance, Calif.

[22] Filed: Sept. 20, 1967

[21] Appl. No.: 669,315

Related U.S. Application Data

[63] Continuation of Ser. No. 549,759, April 21, 1966, abandoned, which is a continuation of Ser. No. 176,248, Feb. 28, 1962, abandoned.

[52] U.S. Cl. ......................178/6.6 R, 178/6, 178/7.1, 178/7.3, 179/115.5 PV, 346/78

[51] Int. Cl. ........G01d 15/16, H04r 9/04, H04r 9/12

[58] Field of Search..........178/6.6, 5, 6, 7.1, 7.3, 7.6; 179/2 C, 100.41 M, 100.41 D, 100.41 Z, 115.5 PV; 346/78

[56] References Cited

UNITED STATES PATENTS

| | | | |
|---|---|---|---|
| 2,217,157 | 10/1940 | Cooley | 178/6.6 R |
| 2,245,286 | 6/1941 | Marzocchi | 178/6.6 A |
| 2,903,517 | 9/1959 | Ridings | 179/4 |
| 3,064,077 | 11/1962 | Cary | 178/6.6 R |
| 3,100,242 | 8/1963 | Herbert | 178/7.6 |
| 3,210,466 | 10/1965 | Day | 178/7.3 |
| 2,205,450 | 6/1940 | Wise | 178/6.6 R |

*Primary Examiner*—Howard W. Britton
*Attorney*—Smyth, Roston and Pavitt

[57] ABSTRACT

This invention relates to a system for reproducing a facsimile image. The system includes a transceiver which is adapted to transmit facsimile information or to receive and record facsimile information. The transceiver includes rotary members which rotate past an arcuately disposed document to transmit the information on the document or to receive and record facsimile information on the document.

The record transducer in the transceiver includes a novel electromagnetic arrangement for recording the facsimile information on the document. This novel electromagnetic arrangement includes a thin winding which receives signals representing the facsimile information and varies the characteristics of a magnetic field in accordance with the characteristics of such signals to control the movements of a stylus.

The system constituting this invention transmits the facsimile information through telephone lines. Acoustical couplers are provided at the transmitter and at the receiver for insuring that the information can be transmitted through the telephone lines, even over long distances, and can be successfully reproduced at the receiver.

26 Claims, 12 Drawing Figures

INVENTORS:
Glenn A. Reese
Paul J. Crane

By Smyth, Roston & Pavitt
Attorneys

PATENTED OCT 17 1972

3,699,249

INVENTORS:
Glenn A. Reese
Paul J. Crane

By Smyth, Roston & Pavitt
Attorneys

INVENTORS:
Glenn A. Reese
Paul J. Crane

By Smyth, Roston & Pavitt
Attorneys

INVENTORS:
Glenn A. Reese
Paul J. Crane
By Smyth, Roston & Pavitt
Attorneys

FACSIMILE SYSTEMS, TRANSCEIVERS, AND MARKING TRANSDUCERS THEREFOR

This is a continuation of our application, Ser. No. 549,759 (now abandoned) filed Apr. 21, 1966 and entitled "Facsimile Systems," which in turn is a continuation of our application, Ser. No. 176,248 (now abandoned) filed Feb. 28, 1962 and entitled "Facsimile Systems."

The present invention relates to facsimile systems and, more particularly, to a means for reproducing copies of material at a remote location.

At the present time, it is very frequently desirable to be able to rapidly transmit information or data such as contained in printed documents, drawings, pictures, etc. from one point to another. In order to accomplish this objective, a number of facsimile systems have been proposed for transmitting the desired information from one location to another over a closed circuit or wireless system. Heretofore, such systems have been very complex. As a result, they have not only been difficult to use but have normally also required a skilled operator to obtain satisfactory results. In addition, the equipment has normally been very expensive and of such a nature that it can not be readily moved from one location to another. Accordingly, as a practical matter, the use of previous facsimile systems has been limited to a relatively small number of applications such as the transmission of news pictures etc. Moreover, such transmissions have been restricted to a relatively small number of predetermined locations.

It is now proposed to overcome the foregoing difficulties by providing a facsimile system which will not only be inexpensive and simple to use but will also permit the transmission of data between a wide variety of locations. This is to be accomplished by providing a single compact light weight transceiver unit that may be employed for both transmitting and receiving and which has a bandwidth that is sufficiently low and narrow to permit the data signal to be transmitted over a standard telephone transmission line. As a result, transmission may originate or terminate wherever a telephone is available. Thus, the transceiver unit may be readily moved so that the data may be transmitted between a virtually unlimited number of locations.

More particularly, this is to be accomplished by providing a transceiver unit having mounting means into which a document may be disposed for reproduction or into which a standard piece of paper may be disposed for having a copy of the document reproduced thereon. When the unit is operating in a transmitting mode a transducer such as a photo electric cell progressively scans the entire surface of the document and generates a signal indicative of the data in the document. This signal is preferably in the so-called audio range whereby it may be coupled into a standard telephone for transmission over a standard telephone transmission line. When the unit is operating in a receiving mode, the unit may be coupled into a second telephone for receiving the audio signal therefrom. A reproduction transducer is arranged to scan a blank piece of paper in synchronism with the transmitting transducer and is effective to produce a mark on the paper corresponding to the original document.

According to one form of the present invention, the reproduction transducer includes a low inertia armature that has a member with an electrical conductor circuit printed thereon so as to be disposed in a magnetic field. The current in the circuit will react with the magnetic field and create a force on the armature in proportion to the current. A stylus is operatively connected to the armature so as to ride on a member having a pressure sensitive writing material thereon and force it against the blank paper. The stylus will thus be effective to produce a mark on the paper from an audio signal received from a transmitting unit. As a result, the information on the original document will be reproduced on the blank paper.

According to a second form of the invention the reproducing transducer includes an ink wheel for scanning the surface of a blank paper and applying ink thereto and an air jet for blowing ink from the surface of the wheel. The air jet includes a valve having an armature therein for regulating the flow of air therethrough. The armature includes a member having a coil printed thereon that may be disposed in a magnetic field whereby a current in the printed circuit will cause it to move and vary the amount of air blowing ink from the ink wheel. Thus, the amount of ink applied to the paper will be metered in response to the signal from a pickup or transmitting transducer.

These and other features and advantages of the present invention will become readily apparent from reading the following detailed description particularly when taken in connection with the drawings wherein like reference numerals refer to like parts and wherein.

Figure 1:
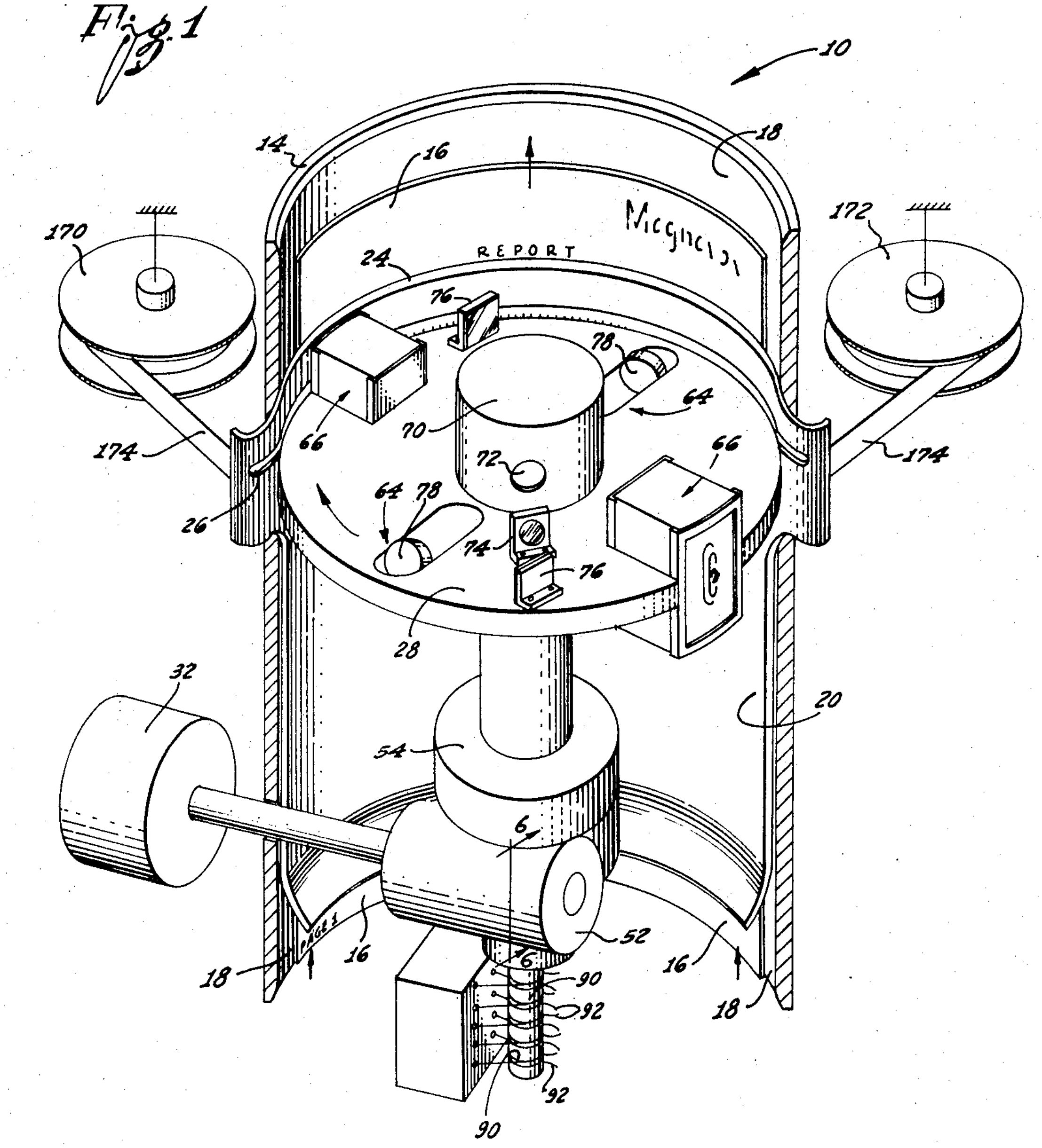
FIG. 1 is a perspective view of a transmitting and receiving unit adapted to be employed in a facsimile system embodying the present invention.

Referring to the drawings in more detail, the present invention is particularly adapted to be embodied in a facsimile system for reproducing copies of a document at a remote location. The present system includes a plurality of substantially identical transceiver units 10 that may operate in either a transmitting or receiving mode. A transmitting unit may be interconnected with a receiving unit by any suitable communications link so that signals may be sent therebetween.

In the present instance each unit includes a transducer 12 that has a cradle or similar device into which the hand set of a standard telephone may be placed. The transducer 12 means may then supply an audio signal that will be acoustically coupled into the mouth piece of the hand set whereby an audio signal will be transmitted over the telephone lines. Similarly the ear piece may provide an audio signal that will be acoustically coupled into the transducer 12. Thus, a unit 10 operating in a transmitting mode may be interconnected with a unit operating in a receiving mode by means of a pair of standard telephones and the telephone line therebetween. As a consequence it will be possible to transmit facsimile copies between any locations where standard telephones are available. In the present instance, all of the units 10 are substantially identical and preferably sufficiently small and compact so as to be readily portable between such locations.

When one of the units 10 is operating in a transmitting mode, a document to be reproduced may be inserted into the unit 10 and the unit may be acoustically coupled to a telephone so as to send a signal over the telephone lines. A second unit operating in a receiving mode and having a blank piece of paper therein may be acoustically coupled to a second telephone so as to receive a signal therefrom and create a copy of the document on the paper.

More particularly, each of the transceiver units 10 includes a backing member or platen 14 having an inner surface 18 that is preferably substantially cylindrical. The arcuate width of this surface 18 is preferably at least equal to the width of a document 16 to be reproduced. In addition, an inner shoe 20 may be disposed inside of the backing member or platen 14 so that a complimentary cylindrical surface thereon is disposed concentric with the inner surface 18 on the back member or platen 14. Thus, a restricted space 22 will be formed between the shoe 20 and backing member 14 whereby a piece of paper or document 16 may be disposed between the two surfaces and moved axially therebetween. The upper end of the shoe 20 preferably includes an arcuate edge 24 that is in a plane normal to the axis of the cylinder. In addition, an elongated aperture 26 may be disposed parallel to the edge 24 but slightly spaced therefrom.

A turn table or scanning wheel 28 may be mounted on a drive shaft 30 which is substantially coaxial with the cylindrical surfaces. The drive shaft 30 forms part of a drive train that is operatively interconnected with an electric motor 32.

The motor 32 is preferably of the so-called synchronous variety wherein the motor 32 will either run at a constant fixed speed that is precisely determined by the frequency of the power source or else it will stall and completely fail to run. As may be seen from FIG. 5, the power for running the motor 32 is obtained from a power amplifier 34. The power amplifier 34 in turn receives a timing signal from a precision signal source such as a mechanical tuning fork 36. The tuning fork 36 preferably is a high Q structure having a natural resonance as close as possible to a predetermined fixed standard frequency. This frequency is a standard for all the units 10 and although it may be of any desired frequency, it is preferably in a range that may pass over a telephone transmission line with little or no difficulty. For example, the frequency may be on the order of 400 cycles per second. With a frequency in this range the power pulses from the motor 32 will occur at very close intervals. As a result the turn table 28 will rotate at a very uniform speed even though it has a low angular inertia.

In order to sustain the vibrations of the tuning fork 36, an output 38 from the amplifier 34 may be connected to a switch 40 which leads to an input of a combined amplitude limiter and low pass filter 42 having a cut-off frequency just above the frequency of the tuning fork 36. The output of the filter 42 is connected to a fork driver 44 coupled to the fork 36. It may thus be seen that when the switch 40 is in the transmitting position, i.e. closed, a timing signal will be fed around a closed loop to form an oscillator having a frequency that will be controlled by the resonant frequency of the tuning fork 36. This, in turn, will insure the output from the amplifier 34 being a fixed frequency so that the motor 32 will run at a constant speed that is determined by the tuning fork 36. In addition, an output 46 may be provided that is interconnected with a switch 48 that leads to the transducer 12. Thus, a timing signal may be derived from the amplifier 46 that may be fed through the switch 48 when it is in the transmit position to the phone transducer 12.

When a unit 10 is operating in a receiving mode, the switches 40 and 48 will be open and the loop will no longer be closed and accordingly it will not act as an oscillator. However, a switch 50 will be closed so as to feed a timing signal from the transducer 12 to the filter 42. Accordingly, when a unit 10 is operating in a receiving mode and the switch 50 is closed, a timing signal will be received from a unit operating in a transmitting mode and will be fed to the fork driver 44. This, in turn, will cause the fork 36 in the receiving unit to vibrate at a fixed frequency that is identical to the frequency of the fork in the transmitting unit. The fork, in turn, will supply a signal to the amplifier 34 so that the motor 32 running in a receiving mode will be driven at the identical speed as the motor 32 in the transmitting unit.

Figure 12:
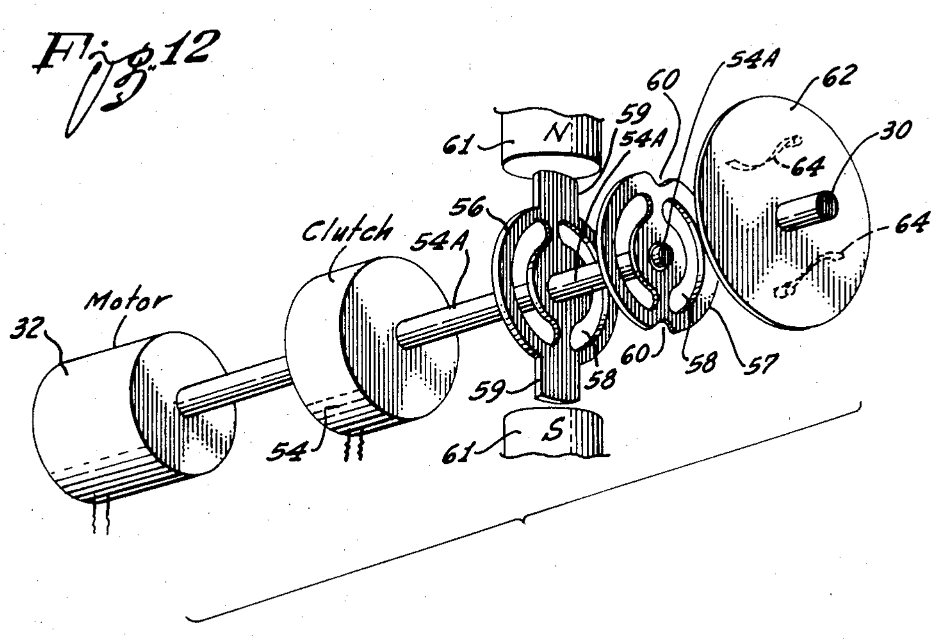
FIG. 12 is an exploded perspective view in schematic form of the drive train.

The drive train (see FIGS. 1, 6 and 12) for interconnecting the motor 32 with the scanning wheel 28 may include suitable gear reducing means 52, and a clutch 54 for disengaging the motor 32 during starting and a lost motion connection 53. The clutch 54 may be of any suitable variety but it is preferably adapted to engage instantly with no slippage. The lost motion connection 53 may include a rotor 56 that is permanently connected to the shaft 54A from the driver portion of the clutch 54. This rotor 56 may be connected to a second rotor 57 which has recesses 60 in the periphery thereof. These recesses 60 may correspond in number and position to the pickup or receiving transducer means in the scanning wheel 28, i.e., two with 180° spacing in the present example. The rotors 56 and 57 preferably have lightening holes 58 to insure a light weight structure with a very low moment of inertia whereby they may be rapidly accelerated when the clutch 54 engages.

The periphery of the rotor 56 may include a plurality of ears 59 such that a permanent magnet 61 will cause the rotors 56 and 57 to always come to rest with the recesses 60 in a predetermined angular position.

The connection 53 may also include a disc 62 that is connected to the drive shaft 30 so as to rotate therewith. One or more resilient detents 63 may be provided on the disk 62 for engaging the recesses 60 in the rotor 56. If the torque required to rotate the scanning wheel 28 approaches the stall torque of the motor 32, the detents 63 will ride out of the recesses 60. However, every time the detents 63 pass through recesses 60, there will be some torque applied to the scanning wheel 28.

When it is desired to operate a receiving unit so as to be in synchronism with a transmitting unit, the motors 32 are started and allowed to reach their synchronous speeds as determined by the standard frequency power from the amplifier 34. When this condition prevails, the clutches 54 are simultaneously energized. This will cause the light weight structure consisting of the rotors 56 and 57 and shaft 54A to instantly run at the same speed as the motors 32. Since the recesses 60 are prealigned by the magnets 61 and since the rotors 56 and 57 in the receiving and transmitting units will commence rotating in identical manners, the recesses 60 will still be in identical phase relation after they are running.

When the motor 32 is running at speed and the clutch 54 is engaged, the lost motion connection 53 will permit the relatively large inertia of the scanning wheel 28 to gradually accelerate to speed without overloading the motor 32. More particularly, when the torque required to rotate the wheel 28 approaches the stall torque of the motor 32 the detents 63 will slip after accelerating the wheel by a small amount. This in turn will gradually accelerate the wheel 28 without overloading the motor. If desired, means may be provided for initially running the wheel 28 at close to speed. For example, a slipping clutch may be disposed in parallel with the clutch 54 and lost motion 51 or a second drive motor may be provided for causing the wheel 28 to run slightly slower than operating speed. Thus when the clutch 54 is engaged, the scanning wheel 28 will already be running at close fo operating speed and a minimum amount of lost motion will occur.

Eventually as the scanning wheel approaches operating speed, the detents 63 will lock into a recess 60 and the wheel 28 will then continue to rotate in a predetermined fixed angular relation to the rotors 56 and 57. Since, as pointed out above, the rotors 56 and 57 in the transmitting and receiving units are in synchronism, the scanning wheels 28 will also be locked in synchronism with the desired phase relation.

It should be noted that the speed at which a motor 32 is running in any unit will be determined by the frequency at which its associated tuning fork 36 vibrates. The tuning fork 36 in the transmitting unit is enclosed in a loop whereby it will act as an oscillator that will form and supply a timing signal to the receiving unit. The tuning fork 36 in the receiving unit will normally be driven by a signal from the transmitting unit and thus will be a slave of the transmitting running fork. Thus, both transmitting and receiving units will run in synchronism. In the event there is a burst of noise or some other interference or even a temporary break in the transmission line, the timing signal from the transmitting unit may be lost to the receiving unit. If this occurs, the fork will no longer be driven and will commence vibrating at its own natural resonant frequency. Since the tuning forks can be given resonant frequencies that are very accurate and substantially identical to each other, the frequency of the power from the amplifier 34 at the receiving unit will be substantially unchanged. As a result, it has been found that even though the receiving unit loses the time signal for a substantial period of time, the scanning wheels in both the receiving and transmitting units will remain in extremely close synchronism.

The scanning wheel 28 has mounted thereon at least one pickup transducer means 64 and at least one reproducing transducer means 66. In the present instance, there are two pickup transducers 64 on diametrically opposite sides of the scanning wheel 28. Although these means may be of any suitable variety in the present instance they are of the so-called photo electric type. As may be seen in FIGS. 2 and 3, a light or lamp 68 is disposed in a hub 70 mounted on the center of the scanning wheel 28 so as to rotate therewith. This lamp 68 projects at least one beam of light through apertures 72 on the diametrically opposite sides of the hub 70. A projecting lens 74 may be mounted on the wheel 28 in alignment with each of the apertures 72 so as to focus the light therefrom into a converging beam directed radially outwardly across the surface of the wheel 28. A mirror 76 may be mounted in alignment with this beam to reflect the beam obliquely toward the surface on the backing member 18. This beam will thus produce a bright spot on the surface of any document 16 disposed in the unit. This spot is preferably immediately above the edge 24 of the shoe 20.

A collecting lens 78 may be disposed upon the wheel 28 adjacent the periphery thereof so as to be focused upon the surface of the document where the bright spot is located. This collecting lens 78 is disposed in an aperture in the wheel and concentrates the light reflected from the spot into a small beam 79 and focuses it downwardly through the wheel 28 at an aperture 80 in the side of the hub 70. The light will then pass through the aperture 88 so as to strike a mirror 82 and be reflected onto the center of a suitable photo electric cell 84.

It may thus be seen that as the wheel 28 rotates periodically one or the other of the projecting lenses 74 will cause a spot of light to scan across the portion of the document immediately above the upper edge 24 of the shoe 20. The collecting lens 78 will then project a beam 81 into the photo cell 84 which will have an intensity proportional to the amount of light reflected from the document 16. Thus, the photo cell 84 will produce an amplitude modulated data signal corresponding to the data present on the line of the document 16 being scanned. Data as used herein includes any material on the document whether it is numbers, letters, drawings, etc. and document as used herein includes anything such as blueprints, photographs, letters, etc. Since only one of the pickup transducers 64 is operative at a time, it is desirable to reduce spurious noise by providing a shield 86 for covering the aperture in alignment with the idle pickup means.

The output of the photo cell 84 is connected to one or more slip rings 90 on the drive shaft so that the photo cell signal may be fed through the brush 92 to the input of an amplifier 94. This amplifier 94 will be effective to increase the amplitude of the output signal from the photo cell to a sufficient level to facilitate its transmission over the telephone lines. The output of the amplifier 94 is connected to a time delay circuit 98 by means of a switch 96. The output of the delay circuit is connected to a sequencing control 100 which, in turn, supplies a signal to the telephone transducer 12.

Between the time that one pickup transducer 64 has scanned a given point on a document 16 and the diametrically opposite pickup transducer 64 is going to scan the same sector, the document may be advanced axially along the cylindrical surface 18 by an amount corresponding to the width of each scan. Although the document may be continuously fed through the unit during the scanning operation, it has been found desirable for the document 16 to remain stationary during each scanning operation. The document is then intermittently advanced during each of the intervals between the completion of one scan and the commencement of the next scan. In order to accomplish this objective, a feed device 102 similar to FIG. 3 may be employed. In this device 102, an arm 104 is pivotally mounted so that one end 106 thereof will ride on the surface of a cam 108 which turns with the drive shaft 30. This cam 108 includes ramps 110 that engage the end 106 of the arm 104 during the scan period and rotates the arm 104 so as to cock a spring 112. In addition, the cam 108 includes a recess 114 that the end 106 of the arm 104 may ride over during the interval between the scan periods. When this occurs, the spring 112 will be free to snap the arm 104 back to its original position.

The opposite end of the arm 104 includes an electromagnet 116 that is disposed adjacent the document 16. A switch 118 is actuated by rotation of the drive shaft so as to close and energize the electromagnet 116 during the interval when the end of the arm 104 approaches and rides into the recess 114.

An iron plug 119 may be floatingly mounted on the backing member 14 so as to register with the end of the electromagnet 116. A paper positioned between the cylindrical surfaces 18 of the backing member 14 and the shoe 20 may slide between the electromagnet 116 and the plug 119 as long as the electromagnet 116 is de-energized. However, when the magnetic is energized, the plug 119 will be drawn toward the magnet 116 and clamp the paper therebetween. It may thus be seen that as soon as the active transducer has completed its scan, the switch 118 will close and energize the electromagnet 116 and thereby clamp the paper against the end thereof. The end 106 of the arm 104 will then fall into the recess 114 on the cam surface and allow the spring 112 to rotate the arm and carry the paper upward. It may thus be seen before each succeeding scanning, the paper will be advanced axially along the surface by an amount corresponding to the width of the scan.

In addition to the pickup transducers 64, a pair of reproduction transducers 66 may be provided. In the present instance, the reproduction transducers 66 are disposed on the diametrically opposite sides of the wheel 28 and midway between the pickup transducers 64. As may be seen in FIG. 4, each of the reproduction transducers 66 includes a pair of substantially identical permanent "horseshoe" magnets 120 and 122. Each magnet 120 and 122 is of substantially rectangular configuration having a channel 124 along one side thereof so that a pair of rectangular pole faces 126 and 128 will be provided. The magnets are positioned with the pole faces 126 and 128 separated by a relatively narrow air gap. The pole faces 126 and 128 are serially positioned so that the lines of flux extend across the air gap between the adjacent faces and will form a complete circle that includes both magnets 120 and 122.

A pair of dielectric end plates 130 and 132 may be secured against the opposite end of the magnets 120 and 122. A small rib 134 on each plate 130 and 132 will extend between the adjacent pole faces 126 and 128 of the magnets and thereby define the width of the air gaps. An armature 136 may be disposed in the air gaps so as to move laterally therein. This armature 136 is a rectangular member 138 such as an electrically non-conductive fiber board. The board has a rectangular shape approximately equal to the area covered by the pole pieces and a thickness that is less than the width of the gaps whereby the armature 136 will be free to reciprocably move in the gaps.

Figures 2, 3, 4:
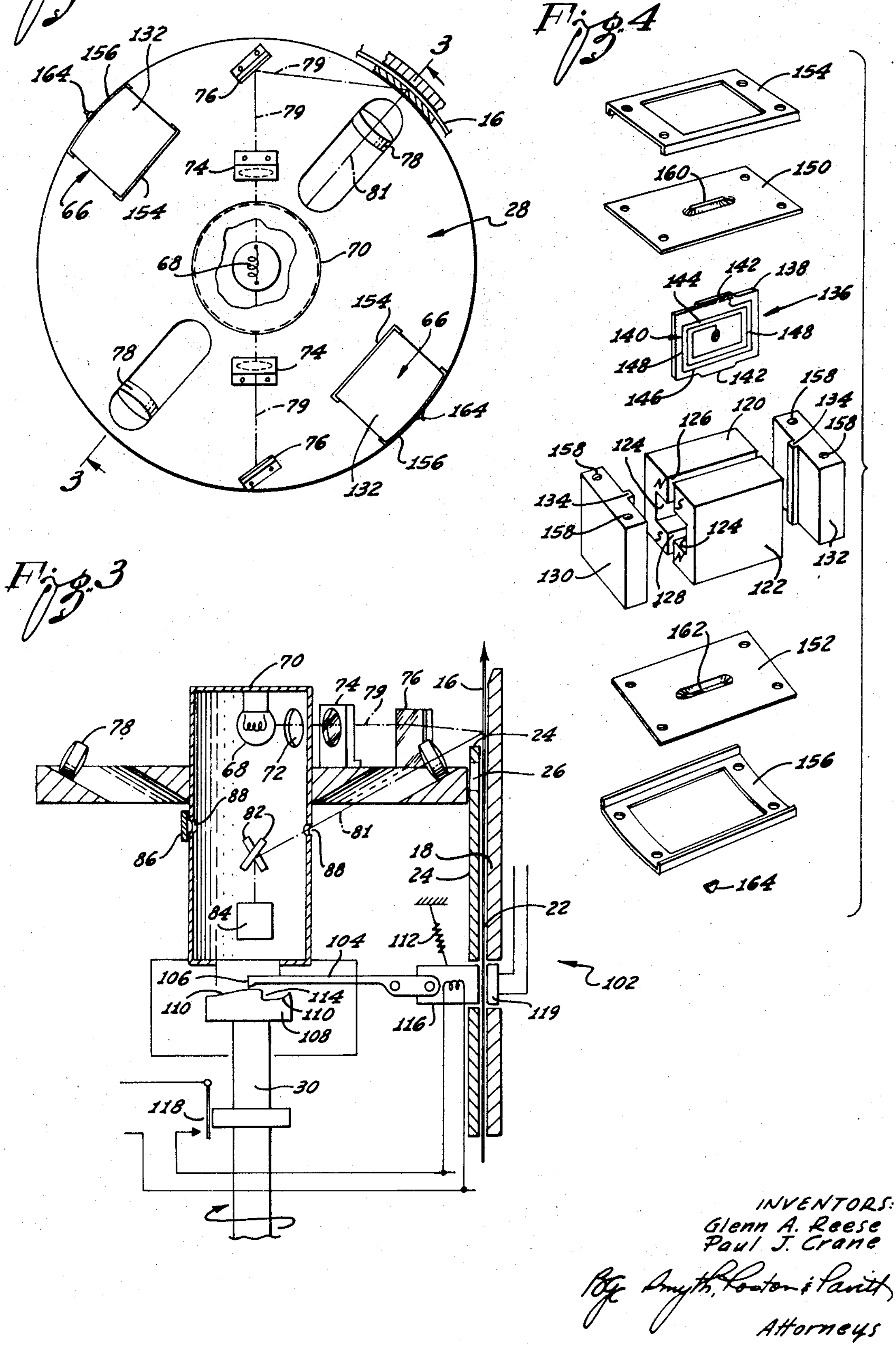
FIG. 2 is a plan view of a scanning wheel or turn table employed in the facsimile apparatus of FIG. 1.
FIG. 3 is a transverse cross-sectional view taken substantially along the plane of line 3—3 in FIG. 2.
FIG. 4 is an exploded perspective view of a reproducing transducer adapted to be mounted on the scanning wheel of FIG. 2.

A conductor 140 may be disposed on the member 138. In the present embodiment, the conductor 140 is printed on the member 138 with one-half disposed on one side of the member 138 and the other half disposed on the opposite side. Each half of the conductor 140 is arranged in a spiral. The outer end of the spiral is electrically connected to an electrical contact 142 that projects from a side of the member 138. The inner end of the spiral extends through the center of the member 138 and connects with the inner end of the other half. Each of the spirals include a plurality of substantially straight upper sections 144 and a plurality of substantially straight lower sections 146 as seen in FIG. 4. These sections 144 and 146 are preferably longitudinally of the member 138 and substantially parallel to the edges having the contacts 142 thereon. A plurality of transverse sections 148 may interconnect the upper and lower sections 144 and 146. It may be seen that when the armature 136 is disposed in the air gap, the portions 144 and 146 will be disposed substantially normal to the direction of the flux field. Thus, if a current flows through the conductor 142, there will be a reaction with the flux field that will produce a force on the armature 136. The direction of this force will be in the plane of the member 138 and will tend to translate the armature through the air gap parallel to the ridges 134. The magnitude of the force will be proportional to the amplitude of the current in the conductor 142.

A pair of metal diaphragms 150 and 152 may be secured to the end blocks 130 and 132 by means of holders 154 and 156 that fit thereover and screws that extend into the screw holes 158. The diaphragms will thus cover the ends of the magnets 120 and 122 but are slightly spaced therefrom. Each of the diaphragms 150 and 152 may have a pocket 160 and 162 in the center thereof so that the electrical contacts 142 will fit therein and the armature 136 will be clamped in position. Thus, an electrical lead may be attached to each diaphragm for supplying an electrical current through the contacts 142 to the conductor 140 on the armature 136 whereby the armature 136 will tend to move and deflect the diaphragms 150 and 152.

A stylus 164 may be provided on one of the diaphragms 152 adjacent the pocket 162 so as to move therewith. It may thus be seen that when a variable current flows through the spiral conductor 140, the armature will distort the diaphragm 152 and move the stylus therewith. Although this motion will normally be very short, the force producing it may be of substantial magnitude. Thus, the force behind the motion of the stylus 164 may be varied at a very high frequency.

Each of the reproduction transducers 66 is mounted on the scanning wheel 28 so that the stylus 164 thereon will be on diametrically opposite sides of the wheel 28 so as to periodically extend through the elongated opening 26 in the shoe 20.

A pair of tape reels 170 and 172 may be provided on the opposite sides of the backing member 14. A tape 174 wound on the reels 170 and 172 will extend between the backing member 14 and the shoe 20 so as to be in substantial alignment with the aperture 26. In addition, the tape 174 will be in engagement with the surface of any paper disposed between the shoe 20 and backing member 14. The stylus 164 may thus extend against the tape 174 and force it against the paper. A layer of pressure sensitive material such as carbon may be provided on the tape 174 whereby a mark will be made on an abutting piece of paper in proportion to the amount of force exerted thereon. Although the stylus 164 may ride against the back of the tape 174, the amount of pressure normally exerted will be inadequate to cause any of the carbon to be transferred to the paper. However, when a current circulates through the conductor 140 on the armature 136, the stylus 164 will be forced outwardly so as to press the tape against the paper with sufficient force to result in a mark being made on the paper.

The diaphragms 150 and 152 may be connected to the output of an amplifier 176 which has the input thereof connected to a switch 178. The switch 178 is, in turn, connected to the telephone transducer 12 by means of the time delay circuit 98 and the sequence control 100.

In order to transmit a copy of a document from a first station to a second station, the document is preferably first inserted between the shoe 20 and the backing member 14 in the transmitting unit. The document is then moved axially so that the beginning of the data to be reproduced is positioned in substantial alignment with the upper edge 24 of the inner shoe 20. At the same time, a piece of blank paper is positioned between the shoe 20 and the backing member 14 in the receiving unit so that the upper edge of the portion of the paper on which the data is to be reproduced registers with the opening 26. The ribbon 174 having the pressure writing material thereon is positioned in sliding contact with the surface of the blank paper and in alignment with the opening 26.

Figure 5:
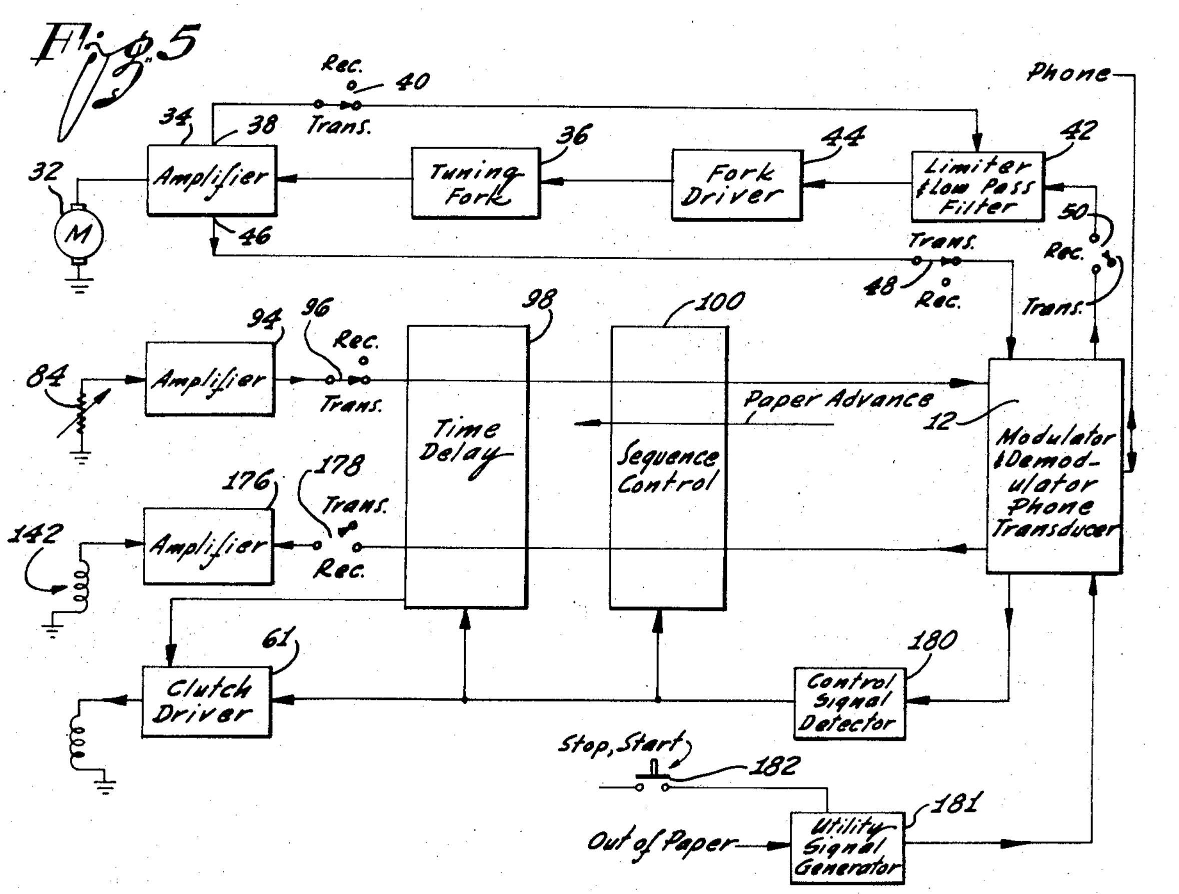
FIG. 5 is a block diagram of a control system adapted to be employed in the transmitting and receiving unit of FIG. 1.

The transmitting unit and the receiving unit may then be interconnected by any suitable communications link. Preferably the communications link includes a pair of conventional telephones with a telephone transmission line extending therebetween. If a telephone system is to be employed as the link, once communication has been established between the sending and receiving stations, the telephone hand piece at the transmitting station is placed in the telephone transducer 12 and the hand piece at the receiving station is placed in the telephone transducer 12 in the receiving unit. The transmitting and receiving units will then be interconnected with each other. The switches 40, 48, 50, 96 and 178 in the transmitter unit all have the movable contacts therein disposed in the transmit positions or substantially as shown in FIG. 5. The switches 40, 48, 50, 96 and 178 are preferably all ganged together so that the movable contacts in the receiving unit may all be simultaneously set in the receive positions or substantially the reverse of that shown.

At this point the switch 180 may be closed in both the transmitting unit and receiving unit. This will energize a signal generator 182 and produce a signal that will be fed to the transducer 12 and the filter 42. The tuning fork driver 44 in the transmitting unit will then excite the tuning fork 36 into vibrating at its natural resonant frequency. These vibrations will be sensed by a suitable transducer and fed into the power amplifier 34. A signal from the output 38 of the amplifier 34 will be fed through the switch 40 to the limiter and low pass filter 42 to supply a power signal to the input of the fork driver and thereby form a closed loop oscillator circuit that will have a frequency identical to the frequency of the fork 36. The amplifier 34 will also provide an output signal of sufficient power and stability to drive the motor 32 at a predetermined fixed speed.

In addition, when the switch 180 is closed, a timing signal will be obtained from the output 46 of the amplifier 34 that is fed through the closed switch 48 to the telephone transducer 12. This fixed frequency signal will be transmitted over the telephone transmission line and fed to the transducer 12 at the receiving unit. Since the switch 50 will be closed, the timing signal will be fed to the input of the limiter and filter 42. This filter will be effective to permit only the fixed frequency signal to pass therethrough to the fork driver 44. Since the switch 40 is open, the driver 44 will not receive a feedback signal and it excites the tuning fork into vibrating at the same frequency as the timing signal passed through the filter 42. The resonant frequency of the receiving fork will be substantially identical to the frequency of the transmitting fork. Therefore, the receiving fork will become a slave of the transmitting fork and will be driven at the identical frequency.

The vibrations from the receiving fork 36 will be supplied to the amplifier 34 so as to feed a power signal to the motor 32 that will cause it to run at the identical speed as the motor 32 in the transmitting unit. Moreover, as described above, the rotors 56 and 57 will be running in phase with each other. The masses of the two scanning wheels 28 and the transducers thereon may be sufficiently large to cause one or both motors to stall or drop several cycles if the wheels 28 are instantly started. Accordingly, initially the detents 63 on the clutch mechanism may pass through recesses 60 several times. However, during each such passage a substantial torque will be applied to the wheel 28 that will cause it to accelerate. When it approaches synchronous speed the detents 63 will drop into the recess and provide a positive, non-slip interconnection wherein the scanning wheels 28 will be rotating at synchronous speed. It should be noted that although the detents 63 in the two units may have slipped by different amounts, when lock up does occur, the scanning wheels 28 will be in predetermined angular relation to the rotors 56 and 57 which, as explained above, are locked in a predetermined relation. Then, the pickup heads on the transmitting unit and the scanning heads on the receiving unit shall be rotating in synchronism.

After the elapse of a sufficient period for the two scanning wheels 28 to be running synchronously, the time delay 98 in the transmitting unit will permit the signal from the pickup transducers 64 to be fed to the transducer 12 and the time delay 98 in the receiver will permit the signal from the transducer 12 to be fed to the reproducer transducer 66.

The lamp 68 in the transmitting unit will project a beam of light 79 onto the mirror that will reflect it onto the document so as to form a luminous spot immediately above the upper end 24 of the shoe 20. The light in this spot will be reflected back as a function of the surface of the document. The reflected light will then be collected by lens 78 and directed to the photo cell 84. The photo cell 84 will then provide a signal that is a function of the surface of the document. This signal will pass through the amplifier 94, the switch 96, the time delay 98 and the sequence control 100 to the transducer 12 where the signal will be fed into the telephone and passed over telephone transmission lines to the receiving telephone.

At the receiving unit, the timing signal portion will pass through the filter 42 to the fork driver 44. This, in turn, will insure the tuning fork 36 vibrating at the fixed frequency and the motor 32 running at a fixed speed whereby the position of the receiving transducer will be maintained synchronized with the pickup transducer. The remainder of the signal will pass through the sequence control 100 and time delay 98 to the amplifier 176 whereby an amplified signal will be fed to the armature 136. As the scanning wheel 28 rotates, the stylus 164 will extend through the aperture 26 and ride along the surface of the ribbon or tape 174. Normally there will be no current flowing in the conductor 140 in the armature 136 and the stylus 164 will exert an inadequate force against the ribbon 174 to produce a mark on the paper. However, when the pickup transducer 64 senses a black line on the original document, a signal will be transmitted so as to cause a current to flow in the conductor 140. It is, of course, readily apparent that the reverse condition may be employed if so desired. The current will flow through the portions 144 and 146 and react with the magnetic field in the air gap so as to cause a lateral force to be produced on the armature 136. This force will urge the stylus 164 against the ribbon 174 with a sufficient force to produce a corresponding mark on the paper. It should be noted that since the armature is very light and does not move any appreciable distance, it may have a very high frequency response.

Once the scanning wheels 28 have rotated enough to have completed a scan across the document and the paper, both the active pickup and reproducing transducers will be displaced respectively from the document and the paper. There will thus be a short interval when the document and paper may be advanced. During this interval, the switch 118 will close and energize the magnet 116 so as to clamp the document and/or paper between the plug 119 and magnet 116. The end 106 of the arm 104 will then pass over the end of the ramp 110 so that the spring 112 may pull the arm 104. The magnetic clutch will then advance the document and/or paper by the width of one scan line so that the next scan may be made.

In the event a malfunction occurs or the operator desires to terminate the transmission, a control signal detector 180 may be provided for transmitting a signal to the time delay circuit 98 and/or the sequence control 100 so as to de-clutch the clutch 52 in the drive train and actuate the time delay 98 and/or control so as to prevent further transmission or reception of facsimile signals. In addition, a control signal generator 181 may be provided that will be actuated by a manual switch 182 or an end of paper pickup so as to trigger an audible alarm to indicate the end of the message, etc.

Figures 10, 11:
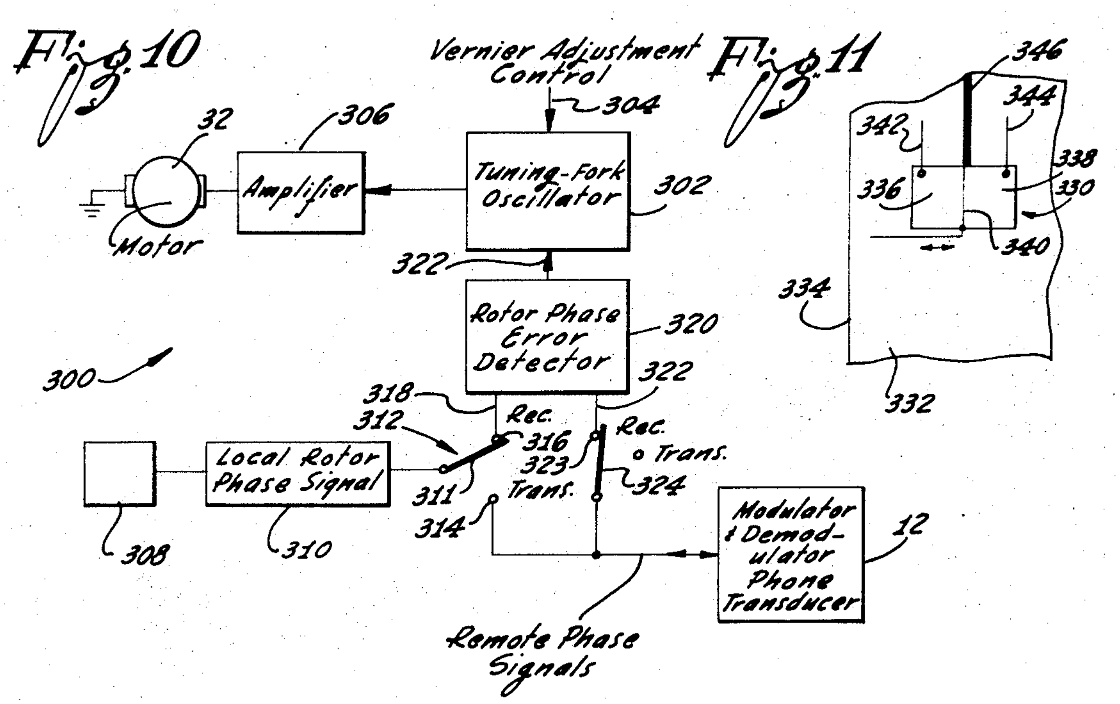
FIG. 10 is a block diagram of a modification of a portion of the control system in FIG. 5.
FIG. 11 is a view of a pickup transducer to be employed with the modification of FIG. 10.

It has been found that under some circumstances it may be desirable to eliminate transmitting the reference signal of standard frequency from the transmitting unit to the receiving unit. In this event the control circuit of FIG. 5 may be modified by replacing the portion thereof that includes the amplifier 34, the tuning fork 36, the fork driver 44 and the amplitude limiter and filter 42 with a circuit 300 such as shown in FIG. 10.

The circuit 300 includes a fork oscillator 302 which includes a tuning fork having a natural resonant frequency identical to a standard frequency such as 400 cycles per second. A vernier adjustment 304 may be included for manually setting the resonant frequency to precisely the standard frequency. A fork driver may be included in the oscillator for maintaining the fork oscillating at its natural frequency. The output of the oscillator 302 is connected to a power amplifier 306 that is effective to increase the amount of power in the standard frequency signal. The output of the amplifier 306 is in turn connected to a synchronous motor 32 to drive it at a fixed speed.

Although the foregoing combination will insure the transmitting and receiving motors running at sufficiently constant speeds for many applications, it has been found in some instances there may be an adequate difference in frequencies of the oscillators 302 in the transmitter and receiver to permit the two motors 32 to run at slightly different speeds. In this event, means may be provided for providing an error signal that will indicate any phase displacement of the turntable or scanning wheels 28. Although there are numerous means for accomplishing this, it has been found that means may be provided in each unit for providing a signal each time the turntable or scanning wheel passes through a predetermined angular position. More particularly, a pickup 308 such as an inductive coil or photo cell may be disposed on the turntable 28 so as to sense the passage of a reference member on the backing member 14.

The pickup 308 may be interconnected with a rotor phase signal generator 310 which will produce a pulse of predetermined shape and duration in response to a predetermined signal from the pickup 308. This pulse, of course, will have a predetermined time relationship with the phase of the turntable 28 and preferably will occur during the interval when the operative transducer is between scanning operations and a data signal is not being transmitted.

The output of the generator 310 may be connected to one of the movable contacts 311 in a two position switch 312. One of the fixed contacts 314 is electrically connected to the transducer 12 for transmitting the phase signal pulse to a receiving unit. The other fixed contact 316 is connected to one input 318 of a comparator or detector 320. The other input 322 is connected to a fixed contact 323 in the switch 312. The movable contact 324 is in turn connected to the transducer 12 for receiving the reference pulse from a transmitting unit.

The comparator 320 has the output thereof interconnected with a vernier adjustment input 322 to the oscillator 302. The comparator 320 is effective to compare the phase signals indicating positions of the local turntable and the remote turntable and to produce a signal that is indicative of the phase difference therebetween. This output signal will be effective to actuate vernier adjustment to the oscillator 302 so as to vary the frequency thereof. This in turn will cause the motor 32 to speed up or slow down and reduce the phase difference between the two signals to zero.

It may thus be seen that when the unit is operating in the transmitting mode the switch 312 will be open and the oscillator 302 will operate at its own natural frequency. However, when the unit is running in a receiving mode the switch 312 will be closed and signals from the local pickup 308 and the corresponding remote pickup will be fed to the comparator 320. The comparator 320 will in turn be effective to produce a vernier adjustment of the oscillator 302 so as to insure the motor running at a speed for insuring the receiving turntable being in phase with the remote turntable.

As another alternative, the embodiment of FIG. 11 may be employed. In this embodiment a transducer such as a photo-cell 330 may be moved on the stationary member such as the shoe 20 so as to scan a narrow region that extends along the paper 332 substantially parallel to the direction of travel and adjacent the edge 334. This photo-cell 330 may include a pair of separate sensitive sections 336 and 338 that are separated from each other by an inactive dividing line 340 whereby each portion may produce an output signal that is independent from the other.

The leads 342 and 344 may be connected to a comparator similar to 320 that will be effective to vary the speed of the motor 32 in response to variations in the relative strength of the two signals on the leads 342 and 344.

During operation of this embodiment the transmitting unit will be effective to transmit a pulse that will be effective to cause the transducers 66 in the receiving unit to draw a straight line 346 that is adjacent the edge 334 and outside of the area where the data will be produced. The signal for this pulse may be obtained from a line drawn in the margin of the original document or a "dummy line," that is created by a contrasting border member positioned over the edge of the document.

Thus each time a pickup transducer on the transmitting unit commences to scan a sector it will sense the line and transmit a pulse that will cause the reproduction transducer 66 to make a mark that will extend the line 346. As long as the receiving turntable 28 is in synchronism with the transmitting turntable the line 346 will be straight and the signal from the two portions 336 and 338 will be balanced. However, in the event the two turntables are not in synchronism the mark will be made too early or too late and the line will tend to bend. However, the instant this occurs the line will not be centered on the line 340 and one portion 336 or 338 will have a larger output. This in turn will result in a vernier adjustment of the oscillator 302 that will speed up or slow down the motor 32 so as to restore the line to straightness. Therefore the two turntables will be kept in synchronism.

Figures 6, 7, 8, 9:
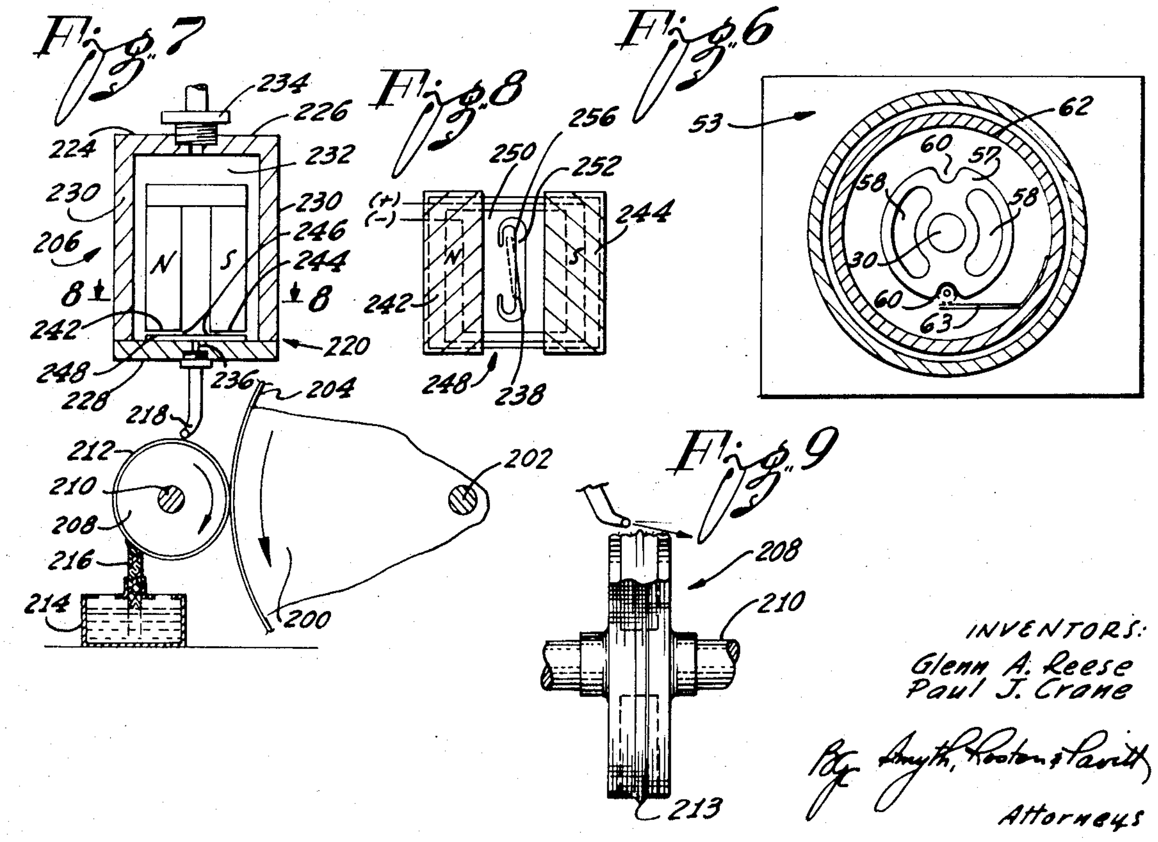
FIG. 6 is a transverse cross-sectional view taken substantially along the plane of line 6—6 in FIG. 1.
FIG. 7 is a view of a reproduction unit for use in a facsimile system embodying another form of the present invention.
FIG. 8 is a transverse cross section view taken substantially along the plane of line 8—8 in FIG. 7.
FIG. 9 is a view, on an enlarged scale, of a portion of the reproduction transducer employed in the embodiment of FIG. 8.

As a further alternative, the embodiment shown in FIGS. 8, 9 and 10 may be employed. In this embodiment, a cylindrical drum 200 is mounted on a shaft 202 so as to rotate about the axis thereof. The exterior of this drum 200 is preferably at least as large as the documents to be reproduced so that a piece of paper 204 of similar size may be wrapped around the drum 200 to thereby present a revolving cylindrical surface.

In order to produce a copy of the document upon the paper 204 a reproduction transducer 206 is provided that is effective to scan the revolving cylinder. This transducer 206 includes an ink wheel 208 that is mounted on a shaft 210 so as to rotate about the axis of the shaft 210. The periphery of the wheel 208 includes a cylindrical surface with a very narrow ridge 212 that projects radially outwardly therefrom so as to continuously engage the surface of the paper 204. Ink may be applied to this ridge 212 by any suitable means. In the present instance this means includes a container 214 of ink and a wick 216 that engages the periphery of the ink wheel 212. In order to cause the transducer 206 to scan the paper 204, the ink wheel 208 may be moved laterally along the drum when the drum is rotating. By way of example, a differential screw or gear reducing means may be provided that will cause the wheel 208 to advance by approximately the width of the ridge 212 every time the drum 200 makes one complete revolution. It may thus be seen that the ink wheel 208 will be capable of drawing a continuous spiral line around the drum. This line would appear as a series of lines that extend across the paper 204 when it is removed from the drum 200 and, more particularly, due to the very close spacing of the lines, the entire surface would appear substantially solid black.

In order to produce a copy of the document, the ink that is actually applied to the paper 204 must be metered so as to correspond to the data that is present on the document. In the present instance this is accomplished by removing the ink from the periphery of the wheel 208 by means of an air jet 218 that directs a stream of air against the periphery of the wheel 208. The flow of air through the jet 218 is controlled by a valve 220 disposed between the jet 218 and a source of compressed air.

The present valve 220 comprises a housing 224 that has a pair of end walls 226 and 228 and a plurality of side walls 230 that are interconnected with each other to enclose and hermetically seal an air tight chamber 232. One end 226 of the housing may include a fitting 234 that is adapted to be interconnected with a source of compressed air. The end wall 228 on the opposite end of the housing 224 may include an outlet passage 236 that is connected directly to the jet 218. The outlet passage 236 forms an opening 238 on the inside of the end wall 228 so that the air may flow therethrough and into the passage 236.

A magnetic circuit is provided inside of the housing 224. This circuit includes a permanent magnet 240 which has a pair of pole faces 242 and 244 that are disposed immediately adjacent the end wall 228. The end wall 228 is preferably a magnetic material whereby a pair of air gaps 246 will be formed adjacent the surface of the wall.

An armature 248, similar to the armature in the first embodiment, may be disposed in these air gaps 246. This armature 248 includes a dielectric member 250 that has an overall shape similar to the shape of the pole faces 242 and 244. The thickness of the member 250 is preferably less than the width of the air gaps 246 whereby the member 250 will be translated through the air gap 246.

A circuit may be provided on the member 250 so that a current may flow therethrough and react with the magnetic field. This circuit is preferably printed on the member and is in the form of at least one spiral on one side of the member 250. A second similar spiral may also be provided on a second side. The spiral includes portions that are normal to the flux field so as to react therewith and produce a lateral force on the member 250.

The member 250 may include an opening 252 in the center thereof that has one side defined by an edge 256. This edge 256 is adapted to register with the opening 238 and to cover varying amounts thereof as it moves laterally. It may be seen that the air pressure in the housing 224 will be effective to assist in maintaining the center portion of the member 250 against the end wall 228 so as to be effective to meter the flow of air exhausting through the passage 236.

When the present embodiment is being employed to produce a copy of a document, the drum 204 and ink wheel 208 are made to move in synchronism with a drum and ink wheel in a transmitting unit. Simultaneously, a signal from the transmitting unit is circulated through the circuit on the armature 248. This current will be effective to cause the armature 248 to move laterally and modulate the air flow similar to the signal.

As the ink wheel 208 rotates, it will pick up ink from the wick 216 and carry the ink past the jet 218. Any air from the jet 218 may blow the ink from the wheel 208. Since the air flow will be controlled by the signal from the transmitting unit, a copy of the document will be produced on the paper 204. More particularly, if the original document is blank at the instant a signal is transmitted, the armature 248 will be moved so as to uncover the aperture 238 and permit a maximum amount of air flow from the jet 218. This will cause all of the ink to be removed from the ridge 212 so that no ink will be applied to the paper 204. If a dark spot is present on the document, the current will permit the armature 248 to cover the aperture 238 and cut off the air flow from the jet 218. As a consequence, ink will be rolled onto the paper 204 so as to duplicate the mark on the document.

It may thus be seen that a facsimile system has been provided that is not only simple and economical to manufacture and use, but is also readily transportable and easily operable by inexperienced and unskilled operators. Although only two embodiments of the present invention have been disclosed and described, it will be readily apparent to persons skilled in the art that numerous modifications and changes may be made without departing from the spirit thereof. Accordingly, the present invention is to be defined only by the appended claims.

What is claimed is:

1. In combination in a facsimile system for receiving signals representing an image and converting the signals into the image on a document, a turntable, an electrical motor operatively interconnected with said turntable for driving said turntable, a power source operatively interconnected with said motor for supplying electrical energy to said motor, said power source having an input and an output, said power source including first frequency standard means, means operatively coupled to said first frequency standard means for driving said first frequency standard means, a power amplifier having an input and an output, said amplifier having its input interconnected with said first frequency standard means and its output interconnected with said motor, second frequency standard means, and means for providing a controlled connection of the driving means with said output of said amplifier at first particular times and with said second frequency standard means at second particular times different from said first particular times.

2. In combination in a facsimile unit for producing on a medium a copy of the contents of a document, rotatable support means, a pickup transducer mounted on said support means for scanning said document during the rotation of said support means to produce a signal having at each instant characteristics dependent upon the contents of said document, a reproduction transducer mounted on said support means for scanning said medium during the rotation of said support means to produce a mark on said medium in accordance with the characteristics of said signal, a motor operatively interconnected with said support means for driving said support means at a particular speed, a power source operatively coupled to said motor for supplying electrical energy to said motor, said source including oscillating means having capabilities of being driven at a particular frequency or of running free at substantially the particular frequency to control the particular speed at which said support means is driven by said motor in accordance with the frequency of said oscillating means, means controllably coupled to the oscillating means for driving the oscillating means at the particular frequency, and means operatively coupled to the oscillating means and to the last mentioned means for controlling whether the oscillating means runs free or is driven.

3. In combination, a magnetic circuit having an air gap to define opposite magnetic poles across the air gap for the production of flux by the poles, a thin planar member disposed in said air gap with the planar member disposed in a direction transverse to the flux between the magnetic poles for movement of the member in the transverse direction, a thin electrically conductive circuit included with said member with a portion of the circuit positioned in the transverse direction between the poles to thereby impose a force on said armature, and means electrically coupled to the electrically conductive circuit for obtaining a flow of current through the circuit to obtain a movement of the thin planar member in the transverse direction in accordance with the flow of current.

4. The combination set forth in claim 3 wherein the magnetic circuit has a planar air gap of substantially uniform width and wherein the thin electrically conductive circuit is printed on the thin planar member.

5. The combination set forth in claim 3 wherein the thin planar member is provided with first and second opposite surfaces defining the member and wherein portions of the thin electrically conductive circuit are included on the first and second opposite surfaces of the thin planar member.

6. The combination set forth in claim 3 wherein the opposite magnetic poles in the magnetic circuit respectively have north and south polarities.

7. The combination set forth in claim 3 wherein the magnetic circuit has a planar air gap of substantially uniform width and wherein the stylus is disposed in contiguous relationship to the medium.

8. In combination for controlling the recording of information on a medium, a magnetic circuit having an air gap to define first and second magnetic poles at opposite ends of the air gap and to produce a magnetic field across the air gap, an armature comprising a thin planar member having a thickness less than the width of said air gap and disposed in the air gap for movement through said air gap in the planar direction, at least one thin conductor included on said member in a plane substantially perpendicular to the magnetic field across the air gap to obtain the imposition of a translating force on said armature, a stylus operatively coupled to the armature for movement with the armature and disposed relative to the medium for controlled movement into engagement with the medium in accordance with the movements of the armature, and means operatively coupled to the thin conductor for obtaining a controlled flow of current through the conductor with characteristics representing information for recording on the medium to obtain movements of the armature in the planar direction in accordance with the characteristics of the current.

9. The combination set forth in claim 8, including, means operatively coupled to the magnetic circuit and the medium for obtaining a relative movement between the member and the medium to obtain a recording of information by the stylus at different positions on the medium.

10. A transducer for use in a facsimile system including a medium upon which data is to be reproduced, including:

a magnetic circuit formed from a permanent magnet with an air gap in the magnet to obtain the production of a magnetic field across the gap, a thin planar armature disposed in said air gap and having a thin electrical conductor disposed on said member at right angles to the magnetic field to obtain a movement of the member through the magnetic field to obtain a movement of the member through the magnetic field in a direction substantially perpendicular to the field in accordance with the flow of current through the conductor, means operatively coupled to the armature and disposed relative to the medium for producing a mark on said paper in accordance with the movements of the armature in the direction perpendicular to the magnetic field, and means operatively coupled to the conductor for producing a flow of current through the conductor with characteristics, at each instant, representing the mark to be produced by the marking means on the medium.

11. The transducer set forth in claim 10, including, means operatively coupled to the magnetic circuit and the armature for obtaining a movement of the magnetic circuit and the armature linearly across the medium to obtain a recording of information by the marking means at different positions on the medium.

12. The combination set forth in claim 10 wherein the marking means is disposed at all times against the medium and wherein the air gap in the magnet defines a pair of opposite poles respectively having north and south polarities.

13. The combination set forth in claim 12 wherein the thin planar armature is defined by first and second planar surfaces and wherein portions of the thin electrical conductor are included on the first and second planar surfaces.

14. In combination for use in a facsimile system for writing on the surface of a medium, a magnetic circuit having a pair of magnetic members positioned to define a pair of air gaps and to produce a magnetic field across said air gaps, a pair of electrically conductive diaphragms secured to said magnetic members, a thin planar armature resiliently supported by said diaphragms in said air gaps for movement in a direction substantially perpendicular to the magnetic fields in the air gaps, a thin electrical conductor included on said armature and electrically interconnected with said diaphragms for producing a movement of the diaphragms in the direction perpendicular to the magnetic fields in accordance with the characteristics of the current flowing through the armature, at least a portion of said conductor being disposed in said magnetic field at substantially right angles to the magnetic field, a stylus on at least one of said diaphragms for scanning across said medium for recording marks on said medium, and means electrically coupled to said diaphragms for obtaining a flow of current through said diaphragms and said conductor with characteristics, at each instant, representing marks to be recorded on the medium.

15. The combination set forth in claim 14 wherein the magnetic members in the magnetic circuit are positioned to define a pair of plane-aligned air gaps and to produce a substantially constant magnetic field across the air gaps.

16. A facsimile unit for reproducing, on a medium at a first position, a copy of the contents of a document at a second position by the transmission of information through telephone lines where first and second telephone handsets are disposed at first and second opposite ends of the telephone lines and are connected to the telephone lines to provide a transducing action between the production of acoustical signals and the generation of electrical signals, including, first rotatable support means at the second position, first motor means operatively interconnected with said first support means for rotating said first support means, a first power source operatively coupled to said motor and having particular frequency characteristics for energizing said motor means in accordance with the frequency characteristics of the power source, first transducer means mounted on said first support means for scanning the surface of said document and producing a signal having characteristics dependent upon the data on said document, means operatively connected to the first transducer means and to the first telephone handset for obtaining a transmission through the first telephone handset and the telephone lines of the signals from the second position to the first position, second rotatable support means at the first position, second motor means operatively coupled to the second support means for rotating the second support means, a second power source operatively coupled to said second motor and having particular frequency characteristics for energizing the second motor in accordance with the frequency characteristics of the second power source, second transducer means mounted on said second support means and coupled to the second telephone handset and responsive to said signal passing through the telephone lines and the second telephone handset for scanning the medium and producing marks on the medium in accordance with the characteristics of said signal, means for producing a reference signal indicative of the angular position of said first transducer means, and means responsive to said reference signal and to the position of said second transducer means for obtaining variations in the frequency from said second power source to vary the speed at which said second motor means drives said second support means.

17. A facsimile system for use with telephone lines having a limited pass band to provide a recording of information on a medium in accordance with information on a document where first and second telephone handsets are disposed at first and second opposite ends of the telephone lines and are connected to the telephone lines to provide a transducing action between the production of acoustical signals and the generation of electrical signals, including:

a first transceiver disposed at the first end of the telephone lines, a second transceiver disposed at the second end of the telephone line, support means in said first transceiver for retaining said document in position, transducer means in said first transceiver for scanning said document and generating a facsimile signal having characteristics dependent upon the contents of said document and within the limited pass band of said telephone lines, motor means in said first transceiver and interconnected with one of said support and transducer means in said first transceiver for producing movement between the transducer means and said document, control means in said first transceiver for generating a control signal having a particular frequency, said control means being interconnected with said motor means in said first transceiver to regulate the speed of said motor in accordance with the frequency of said control signal, means in said first transceiver and interconnected with said control means and said transducer means and coupled through the first telephone handset to said telephone lines for coupling said facsimile signal and said control signal into said telephone lines, support means in said second transceiver for retaining the medium in position, second transducer means in said second transceiver for scanning said medium, said second transducer means being responsive to said facsimile signal to make a mark on said medium in accordance with the characteristics of said facsimile signal, motor means in said second transceiver and interconnected with one of said support and transducer means in said second transceiver for producing movement between the second transducer and said medium to obtain a scanning of the medium by the second transducer in the second transceiver, coupling means in said second transceiver and coupled through said second telephone handset to said telephone lines for receiving said facsimile and control signals from said telephone lines, control means in said second transceiver to generate a control signal in accordance with the control signal in the telephone lines and interconnected with said motor means in said second transceiver to control the speed of said motor means in said second transceiver in response to said control signal for a synchronization in the speeds of the motor means in the first and second transceivers, and means interconnecting said coupling means in said second transceiver with said second transducer in said second transceiver for coupling said facsimile signal into said second transducer to obtain a marking of the medium by said second transducer in accordance with the characteristics of said facsimile signal.

18. In combination for reproducing on a medium at a first position the contents of a document at a second position displaced from the first position by the transmission of information from the second position to the first position through telephone lines, a platen having an arcuate configuration in a first direction and having a linear configuration in a second direction substantially perpendicular to the first direction, support means, means for obtaining a relative rotation of the support means in the first direction past the platen, means for obtaining an advance of the medium relative to the support means in the second direction during the relative rotation of the support means past the platen, means for obtaining a transmission from the second position to the first position of signals having characteristics dependent at each instant upon the contents of the document at individual positions on the document, a magnetic circuit disposed on the support means and including an air gap and further including means for producing a magnetic field across the air gap, a thin planar member extending into the air gap, a thin planar conductor disposed on the thin planar member and disposed within the air gap for providing a movement of the thin planar member into and out of the air gap in a direction substantially perpendicular to the air gap in accordance with the characteristics of the current flowing through the air gap, means responsive to the signals received at the first position and operatively coupled to the conductor for producing a flow of current through the conductor in accordance with the characteristics of the signals, and marking means operatively coupled to the thin planar member and disposed relative to the medium for producing marks on the medium in accordance with the variations in the movements of the member at each instant.

19. The combination set forth in claim 18, including:

control means responsive to the signals received at the first position for varying the speed of the support means relative to the platen at each instant in accordance with the characteristics of the received signals at that instant to obtain an undistorted reproduction on the medium of the contents of the document.

20. In combination in a facsimile unit for providing a transducing action between the contents of a document and a signal having characteristics dependent upon the contents of such document, rotatable support means, means operatively coupled to the support means for rotating the support means, means for holding the document in an arcuate configuration, first transducer means mounted on said support means and disposed relative to said document-holding means for scanning said document during the rotation of said support means to produce at each instant the signal having characteristics dependent upon the contents of said document, second transducer means mounted on said support means and disposed relative to said document-holding means for scanning said document during the rotation of said support means to convert the signal to the production of the contents on the document, and switching means operatively coupled to the first and second transducer means for selectively activating the first transducer means at first particular times and for selectively activating the second transducer means at second particular times different from the first particular times, where the second transducer means includes a magnetic circuit having a planar air gap to define first and second magnetic poles at opposite ends of the air gap and to produce a magnetic field across the air gap, an armature comprising a thin planar member having a thickness less than the width of said air gap and disposed in the air gap for movement through the air gap in the planar direction, at least one thin conductor included on the thin planar member in a plane substantially perpendicular to the magnetic field across the air gap to obtain the imposition of a translating force on the armature, a stylus operatively coupled to the armature for movement with the armature and disposed relative to the document for controlled movement into engagement with the document in accordance with the movement of the armature, and means operatively coupled to the thin conductor for obtaining a controlled flow of current through the conductor with characteristics representing information for recording on the medium to obtain movements of the armature in the perpendicular direction in accordance with the characteristics of the current.

21. In combination in a facsimile unit for providing a transducing action between the contents of a document and a signal having characteristics dependent upon the contents of such document, rotatable support means, means operatively coupled to the support means for rotating the support means, means for holding the document in an arcuate configuration, first transducer means mounted on said support means and disposed relative to said document-holding means for scanning said document during the rotation of said support means to produce at each instant the signal having characteristics dependent upon the contents of said document, second transducer means mounted on said support means and disposed relative to said document-holding means for scanning said document during the rotation of said support means to convert the signal to the production of the contents on the document, and switching means operatively coupled to the first and second transducer means for selectively activating the first transducer means at first particular times and for selectively activating the second transducer means at second particular times different from the first particular times wherein the first transducer means is optical and the second transducer means is electromagnetic and wherein means are provided for obtaining a movement of the document in an axial direction relative to the support means during the rotation of the support means to obtain a scan of the document, wherein the first transducer means includes a light source, optical means disposed for rotation with the support means relative to the document-holding means and disposed to receive light from the light source and to direct the light toward the document-holding means for the passage of light from the document on the document-holding means with characteristics in accordance with the contents on the document, means disposed relative to the light passing from the document to receive such light and to produce signals having characteristics in accordance with the characteristics of the received light, the second transducer means including a magnetic circuit having a planar air gap to define first and second magnetic poles at opposite ends of the air gap and to produce a magnetic field across the air gap, an armature comprising a thin planar member having a thickness less than the width of said air gap and disposed in the air gap for movement through the air gap in the planar direction, at least one thin conductor included on the thin planar member in a plane substantially perpendicular to the magnetic field across the air gap to obtain the imposition of a translating force on the armature, a stylus operatively coupled to the armature for movement with the armature and disposed in contiguous relationship to the document for controlled movement into engagement with the document in accordance with the movements of the armature, and means operatively coupled to the thin conductor for obtaining a controlled flow of current through the conductor with characteristics representing information for recording on the medium to obtain movements of the armature in the perpendicular direction in accordance with the characteristics of the current.

22. The combination set forth in claim 21, wherein the first transducer also includes second optical means disposed for rotation with the turntable relative to the document-holding means and disposed to receive light from the light source and to direct the light toward the document-holding means for passage of the light from the document on the document-holding means with characteristics in accordance with the contents on the document, the first and second optical means being angularly displaced from one another in the first direction to provide for a direction of light by only one of the first and second optical means toward the document at each instant, and means disposed relative to the first and second optical means to block the passage of light at each instant to the light-receiving means from the particular one of the first and second optical means not directing light toward the document.

23. In combination, a magnetic circuit having a thin air gap to define opposite magnetic pole faces across the air gap, said magnetic circuit producing flux across said air gap, a thin sheet-like member disposed in said air gap with the member disposed in a direction transverse to the flux between the magnetic poles for movement of the member in the transverse direction, said member comprising a thin electrically conductive circuit with at least a portion of the circuit positioned in the transverse direction between the poles so that current flow through said circuit will impose a force on said member, and said circuit adapted for connection to means for obtaining a flow of current through the circuit to obtain a movement of the thin member in the transverse direction in accordance with the flow of current.

24. The combination of claim 23 with the thin sheet-like member being planar and the pole faces being planar.

25. The combination of claim 23 with the thin electrically conductive circuit comprising a continuous winding that is wound from an outer loop to successively smaller inner loops, said magnetic circuit producing magnetic flux in a first direction that interacts with the current in first segments of the winding loops carrying current in one direction and producing magnetic flux in a second direction which is opposite to said magnetic flux in said first direction, with the flux in said second direction interacting with the current in second segments of the loops, with said second segments carrying current in a direction opposite to said one direction so that the forces from the currents in the first and second segments will reinforce one another to move said member relative to said flux.

26. The combination of claim 25 with the thin electrically conductive circuit comprising two continuous windings that are wound from an outer loop to successively smaller inner loops with the two smallest loops in each winding being electrically connected, said windings being placed facing one another and wound so that the current flows in the windings in the same direction.

* * * * *